(12) United States Patent
Morita

(10) Patent No.: US 10,860,644 B2
(45) Date of Patent: Dec. 8, 2020

(54) IMAGE PROCESSING APPARATUS

(71) Applicant: KYOCERA Document Solutions Inc., Osaka (JP)

(72) Inventor: Keiko Morita, Osaka (JP)

(73) Assignee: Kyocera Document Solutions, Inc.

( * ) Notice: Subject to any disclaimer, the term of this patent is extended or adjusted under 35 U.S.C. 154(b) by 119 days.

(21) Appl. No.: 15/991,589

(22) Filed: May 29, 2018

(65) Prior Publication Data

US 2018/0349414 A1    Dec. 6, 2018

(30) Foreign Application Priority Data

Jun. 5, 2017   (JP) .................................. 2017-110534

(51) Int. Cl.
*G06F 16/00* (2019.01)
*G06F 16/583* (2019.01)
*G06K 9/00* (2006.01)
*G06F 16/16* (2019.01)

(52) U.S. Cl.
CPC ........ *G06F 16/5846* (2019.01); *G06F 16/164* (2019.01); *G06K 9/00456* (2013.01)

(58) Field of Classification Search
CPC .............. G06F 16/5846; G06F 16/164; G06K 9/00456
See application file for complete search history.

(56) References Cited

U.S. PATENT DOCUMENTS

2005/0063009 A1   3/2005  Ehara et al.
2006/0143154 A1*  6/2006  Jager ..................... G06F 16/93
2017/0272265 A1*  9/2017  Okazato ................ G06F 3/1454

FOREIGN PATENT DOCUMENTS

JP    2005-056315    3/2005
JP    2013140543     7/2013

* cited by examiner

*Primary Examiner* — Usmaan Saeed
*Assistant Examiner* — Paul Kim

(57) ABSTRACT

An image processing apparatus includes a storage device where one or plural document boxes are arranged, and a box save processing unit. The box save processing unit is configured to determine a document box as a save location of an image file of a document image among the one or plural document boxes, specify a file name of the document image, and save the image file in the determined document box. Further, the box save processing unit (a) determines a file name extraction rule in box property data of the determined document box, (b) extracts a file name from an area specified by the file name extraction rule in the document image, and (c) specifies the extracted file name to the image file and saves the image file in the determined document box.

8 Claims, 5 Drawing Sheets

FIG. 3

| BOX ID | BOX NAME | BASIC RULE SETTING | | OTHER RULE SETTING |
|---|---|---|---|---|
| BOX #1 | WRITTEN ESTIMATE | RULE #1 | PRIORITY: 1<br>EXTRACTION PAGE: 1<br>EXTRACTION POSITION: MANUAL SETTING | AUTO GENERATION: ON<br>FIXED TEXT: "OTHER"<br>ADDITIONAL INFORMATION SETTING:<br>DATE AND TIME |
| | | RULE #2 | PRIORITY: 2<br>EXTRACTION PAGE: 1<br>EXTRACTION POSITION: BOTTOM RIGHT | |
| BOX #2 | APPLICATION REQUEST FORM | RULE #1 | PRIORITY: 1<br>EXTRACTION PAGE: 1<br>EXTRACTION POSITION: BOTTOM LEFT | AUTO GENERATION: ON<br>FIXED TEXT: "UNSPECIFIED"<br>ADDITIONAL INFORMATION SETTING:<br>BOX NAME + DATE AND TIME |

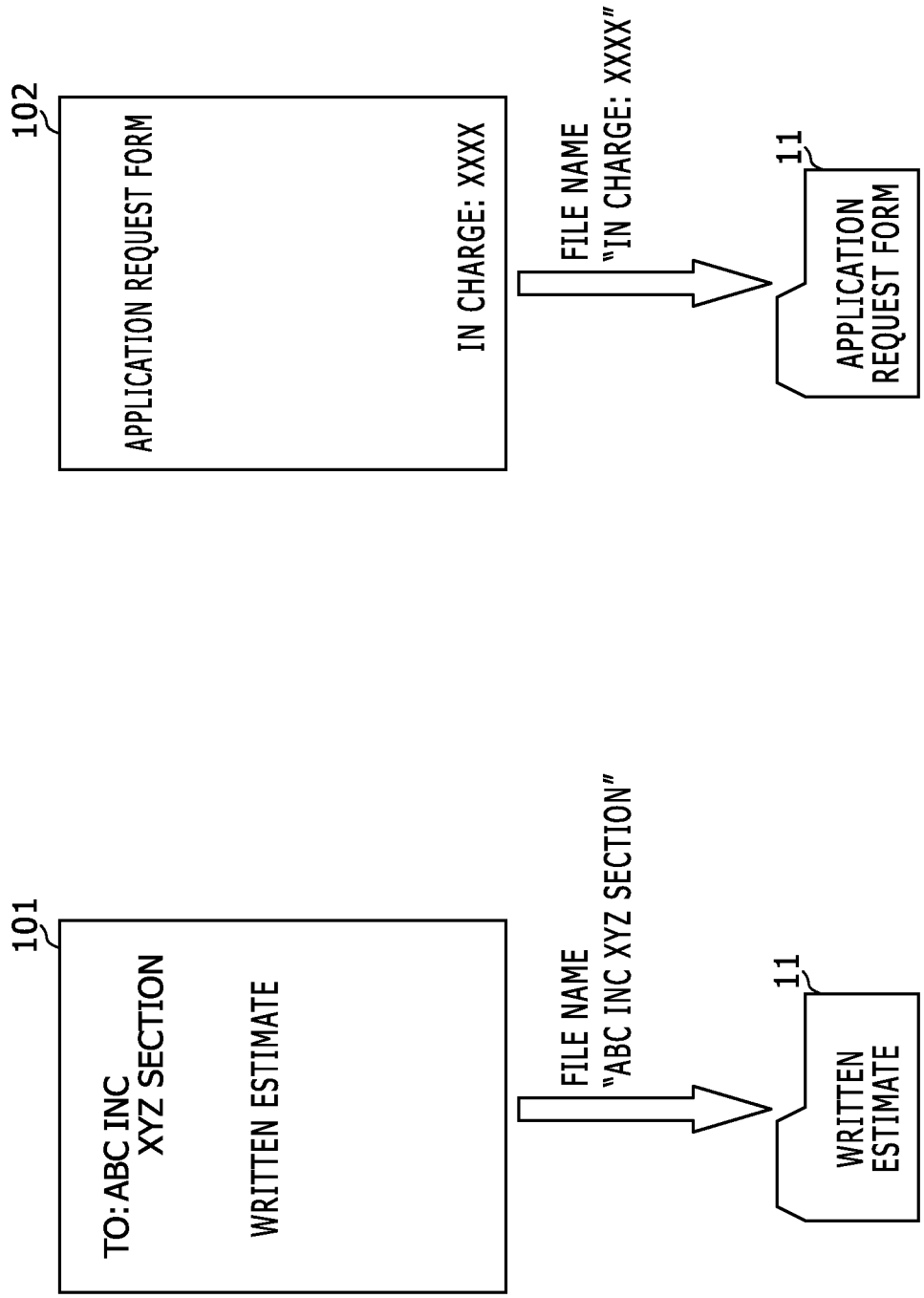

IMAGE PROCESSING APPARATUS

CROSS-REFERENCE TO RELATED APPLICATIONS

This application relates to and claims priority rights from Japanese Patent Application No. 2017-110534, filed on Jun. 5, 2017, the entire disclosures of which are hereby incorporated by reference herein.

BACKGROUND

1. Field of the Present Disclosure

The present disclosure relates to an image processing apparatus.

2. Description of the Related Art

An image processing apparatus performs a character recognition process for an image of a predetermined area in an image scanned from a document, and specifies a file name of an image file of the scanned image with a text obtained from the area.

For example, in an image forming apparatus such as scanner or multi function peripheral, an image file of a document image scanned from a document may be stored in a specific document box. In addition, if such an image forming apparatus includes plural document boxes, image files of document images may be stored in different document boxes corresponding to document types or the like of the documents. In such a case, it is favorable to set a file name of an image file for a user who will read an image file later to easily know content of the image file.

However, in the aforementioned image processing apparatus, regardless of a save location of an image file, a file name of the image file is set in accordance with a fixed rule, and consequently, the file name may not be set so as to enable a user to easily know content of the image file.

For example, there is a case that a file name of an image file of a document should be set as a section name when saving the image file in a specific document box, but a file name of an image file of another document should be set as a name of a person in charge when saving the image file in another specific document box. In such a case, since a section name and a name of a person in charge are described different positions in a document and the aforementioned image processing apparatus uses the fixed rule, the aforementioned image processing apparatus hardly sets file names using different rules corresponding to save locations of documents (i.e. image files).

SUMMARY

An image processing apparatus according to an aspect of the present disclosure includes a storage device where one or plural document boxes are arranged, and a box save processing unit. The box save processing unit is configured to determine a document box as a save location of an image file of a document image among the one or plural document boxes, specify a file name of the document image, and save the image file in the determined document box. Further, the box save processing unit (a) determines a file name extraction rule in box property data of the determined document box, (b) extracts a file name from an area specified by the file name extraction rule in the document image, and (c) specifies the extracted file name to the image file and saves the image file in the determined document box.

These and other objects, features and advantages of the present disclosure will become more apparent upon reading of the following detailed description along with the accompanied drawings.

BRIEF DESCRIPTION OF THE DRAWINGS

FIG. 3 shows a diagram that explains an example of a file name extraction rule included in box property data 12 shown in FIG. 1;

FIG. 5 shows a diagram that explains a specific example of a file name determined from a document image.

DETAILED DESCRIPTION

Hereinafter, an embodiment according to an aspect of the present disclosure will be explained with reference to drawings.

Figure 1:
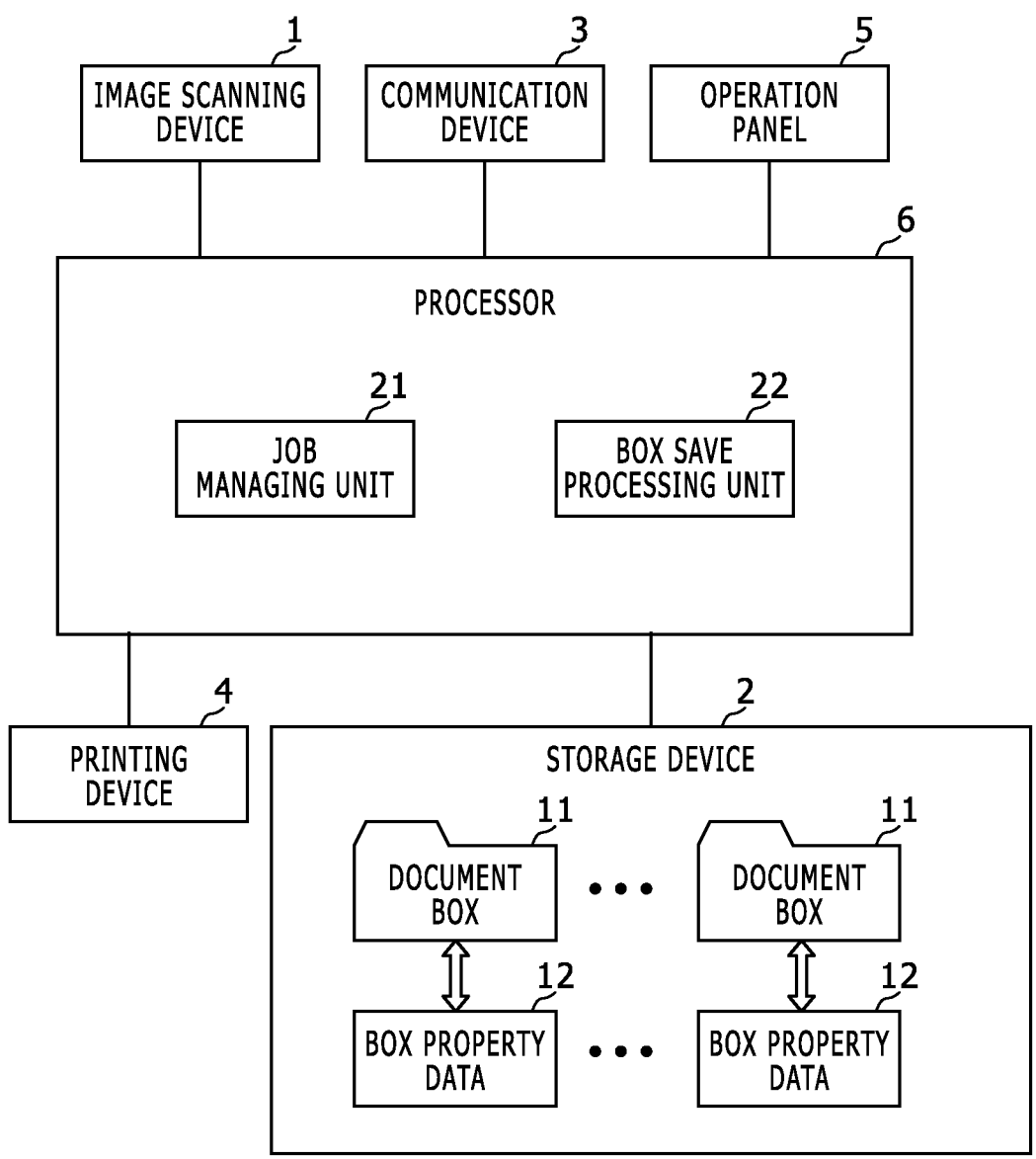
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. The image processing apparatus shown in FIG. 1 is, for example, an image forming apparatus such as a multi function peripheral. The image processing apparatus shown in FIG. 1 includes an image scanning device 1, a storage device 2, a communication device 3, a printing device 4, an operation panel 5, and a processor 6.

The image scanning device 1 is an internal device that optically scans a document image of a document, and generates image data (RGB data, here) of the document image.

Further, the storage device 2 is a device capable of storing sorts of data and programs. A non-volatile storage medium with a large capacity is used as the storage device 2, such as non-volatile memory or hard disk drive.

In the storage device 2, one or plural document boxes is/are arranged so as to be capable of storing an image file of a document image scanned by the image scanning device 1.

Further, the communication device 3 is an internal device, such as network interface, that performs data communication with an unshown user's terminal device through a network.

The printing device 4 prints a document image based on print data on a printing paper sheet.

The operation panel 5 includes a display device, such as a liquid crystal display, that displays sorts of screens to a user, and an input device, such as a touch panel or a hard key, that receives a user operation (e.g. pressing down a soft key or the like).

The processor 6 is a computer that includes a CPU (Central Processing Unit), a ROM (Read Only Memory), a RAM (Random Access Memory) and the like, loads a program from the ROM or the storage device 2 to the RAM, and executes the program with the CPU and thereby acts as various processing units. In this embodiment, the processor 6 acts as a job managing unit 21 and a box save processing unit 22.

The job managing unit 21 receives a job request from a user, and performs the requested job using an internal device such as the image scanning device 1, the communication device 3, the printing device 4 and/or the like.

For example, when receiving a request of a scan-box-save job, the job managing unit 21 performs the requested job using the image scanning device 1 and the like.

The box save processing unit 22 determines a document box 11 as a save location of an image file of a document image, specifies a file name of the document image, and saves the image file in the determined document box 11.

In this embodiment, for example, the document image is an image scanned when the scan-box-save job is performed, and the document box 11 as the save location is specified in a job setting or the like.

For example, a document box as a save location of an image file of a document image is selected and/or specified on the basis of a user operation to the operation panel 5 or as a document box corresponding to a job type of a job that requires to save an image file of a document image.

Specifically, the box save processing unit 22 (a) determines a file name extraction rule (i.e. a rule individually set to a document box) in box property data 12 of the determined document box 11, (b) extracts a file name from an area specified by the file name extraction rule in the aforementioned document image, and (c) specifies the extracted file name to the image file and saves the image file in the determined document box. An extension (".PDF", ".JPG" or the like) is attached to the extracted file name to express a file format of the image file, if necessary.

For example, the box save processing unit 22 extracts an image in an area specified by the file name extraction rule and performs a character recognition process for the extracted area, and thereby determines a file name as a text data.

In this embodiment, the box save processing unit 22 is capable of moving or copying the image file saved in the document box 11 to another document box in accordance with a user operation to the operation panel 5. When the image file saved in the document box 11 is moved or copied to another document box, the box save processing unit 22 determines a file name extraction rule in box property data 12 of the another document box 11, extracts a file name from an area specified by the file name extraction rule in the document image, and specifies the extracted file name to the image file and saves the image file in the another document box. Consequently, the image file is saved in the another document box 11 with a file name different from the original file name set in the original document box 11.

Further, in this embodiment, the box save processing unit 22 is capable of changing a file name extraction rule on the basis of a user operation to the operation panel 5 or the like. When changing the file name extraction rule used to extract the file name, the box save processing unit 22 extracts a file name from an area specified by the changed file name extraction rule in the document image, and changes the current file name of the image file with the extracted file name.

Figure 2:
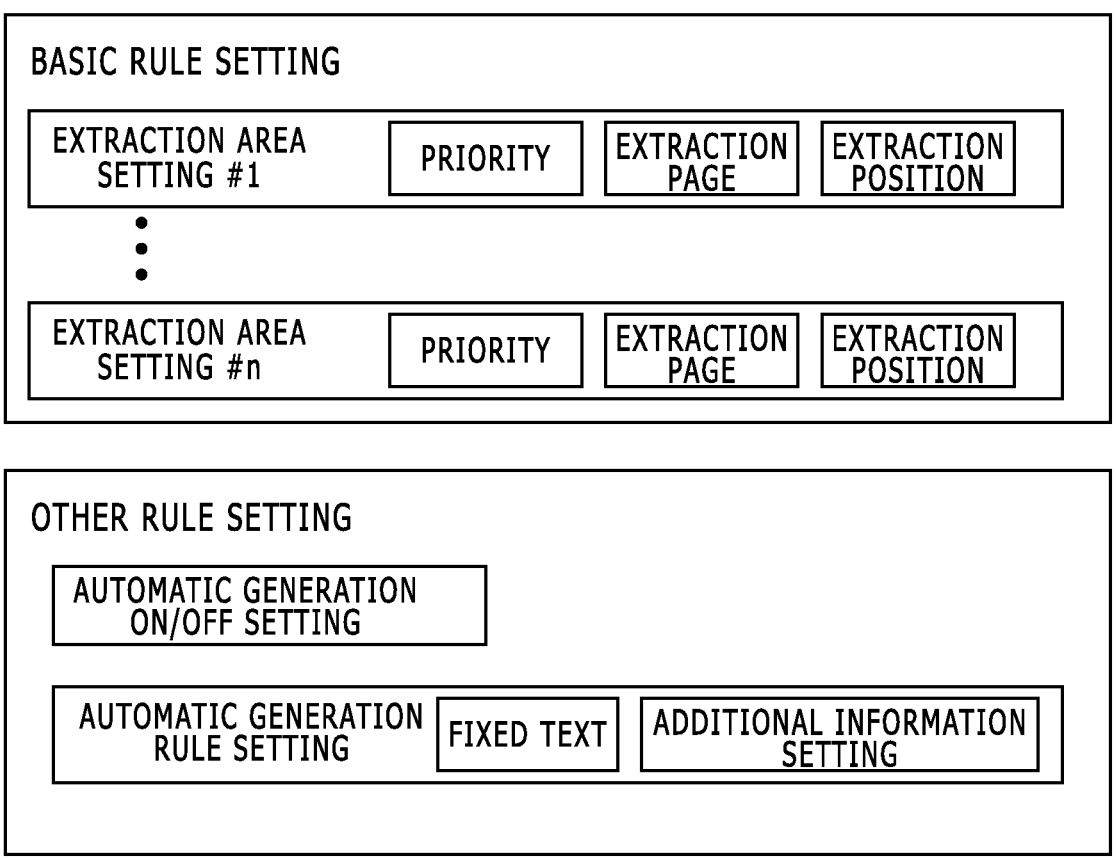
FIG. 2 shows a diagram that explains an example of a format of a file name extraction rule included in box property data 12 shown in FIG. 1.

FIG. 2 shows a diagram that explains an example of a format of a file name extraction rule included in box property data 12 shown in FIG. 1.

The box property data 12 can include a file name extraction rule (basic rule setting) as shown in FIG. 2. This file name extraction rule is applied to an image file to be saved to a document box 11 corresponding to this box property data 12.

In this embodiment, box property data 12 corresponding to one document box 11 can include plural file name extraction rules (plural extraction area settings shown in FIG. 2); and if the box property data 12 includes plural file name extraction rules, the box save processing unit 22 repeatedly tries to extract a file name in an area specified by one of the file name extraction rules in the order of descending priorities set to the file name extraction rules until the file name is successfully extracted, and specifies the extracted file name to the image file and saves the image file in the determined document box.

Here, the file name extraction rule includes not only "priority" but "extraction page" and "extraction position".

The "extraction page" indicates a page number where the file name extraction should be performed. The "extraction position" indicates an area where the file name extraction should be performed.

As the extraction position, top left, top center, top right, bottom left, bottom center, bottom right or manual setting may be set. In the manual setting, a starting position and an ending position (i.e. two corners on one diagonal line of a rectangular) of an image area to be extracted are manually set.

Further, the box property data 12 can include "other rule setting" as shown in FIG. 2. When a file name is not extracted in an area specified by the file name extraction rule in the document image, if the box property data 12 includes other rule setting, the box save processing unit 22 automatically generates a file name on the basis of the other rule setting corresponding to the file name extraction rule (and the determined document box 11), specifies the generated file name to the image file, and saves the image file in the determined document box 11.

Here, the other rule setting includes as setting items an "automatic generation on/off setting" (i.e. a setting of whether automatic generation of a file name is allowed or not based on an automatic generation rule setting), and an "automatic generation rule setting". The "automatic generation rule setting" includes a fixed text and an additional information setting. The fixed text is a static text (i.e. an immediate value) to be included in a file name, and the additional information setting specifies a dynamic text to be attached to the fixed text. As the additional information setting, date and time, number of document pages, user name, box name or the like can be specified.

FIG. 3 shows a diagram that explains an example of a file name extraction rule included in box property data 12 shown in FIG. 1.

In an example shown in FIG. 3, two file name extraction rules are set to the "WRITTEN ESTIMATE" box. For Rule #1 of them, the priority is set as 1, the extraction page is set as 1, and the extraction position is set as manual setting. The smaller numerical value of the priority means higher priority. If the extraction position should be set as manual setting, upon setting the extraction position as manual setting, an image area in which a file name is extracted (coordinate values that indicate positions of the aforementioned two corners) is specified in advance on the basis of a user operation to the operation panel 5.

Further, for Rule #2 of them, the priority is set as 2, the extraction page is set as 1, and the extraction position is set as bottom right. If a file name is not determined on the basis of Rule #1 in high priority, then a file name is determined on the basis of Rule #2 in low priority. If the extraction position is set as bottom right, then a predetermined range from a bottom right corner in a document image is set as an image area in which a file name should be extracted.

Further, in an example shown in FIG. 3, other rule setting exists for the "WRITTEN ESTIMATE" box, and the automatic generation setting is set as ON, and therefore, if a file name is not determined by any of the aforementioned file name extraction rules, then a file name is automatically generated on the basis of the other rule setting.

In an example shown in FIG. 3, in the other rule setting for the "WRITTEN ESTIMATE" box, the fixed text is set as "OTHER", and the additional information setting is set as "DATE AND TIME". Therefore, for example, if a file name is not determined by the file name extraction rules and the current date and time is 30 May 2017 AM10:00, then a file name of an image file to be saved in "WRITTEN ESTIMATE" box is set as "OTHER 30 May 2017 AM10:00" or the like.

Furthermore, as shown in FIG. 3, for another box ("APPLICATION REQUEST FORM" box), another file name extraction rule (and another "other rule setting") is set.

Figure 4:
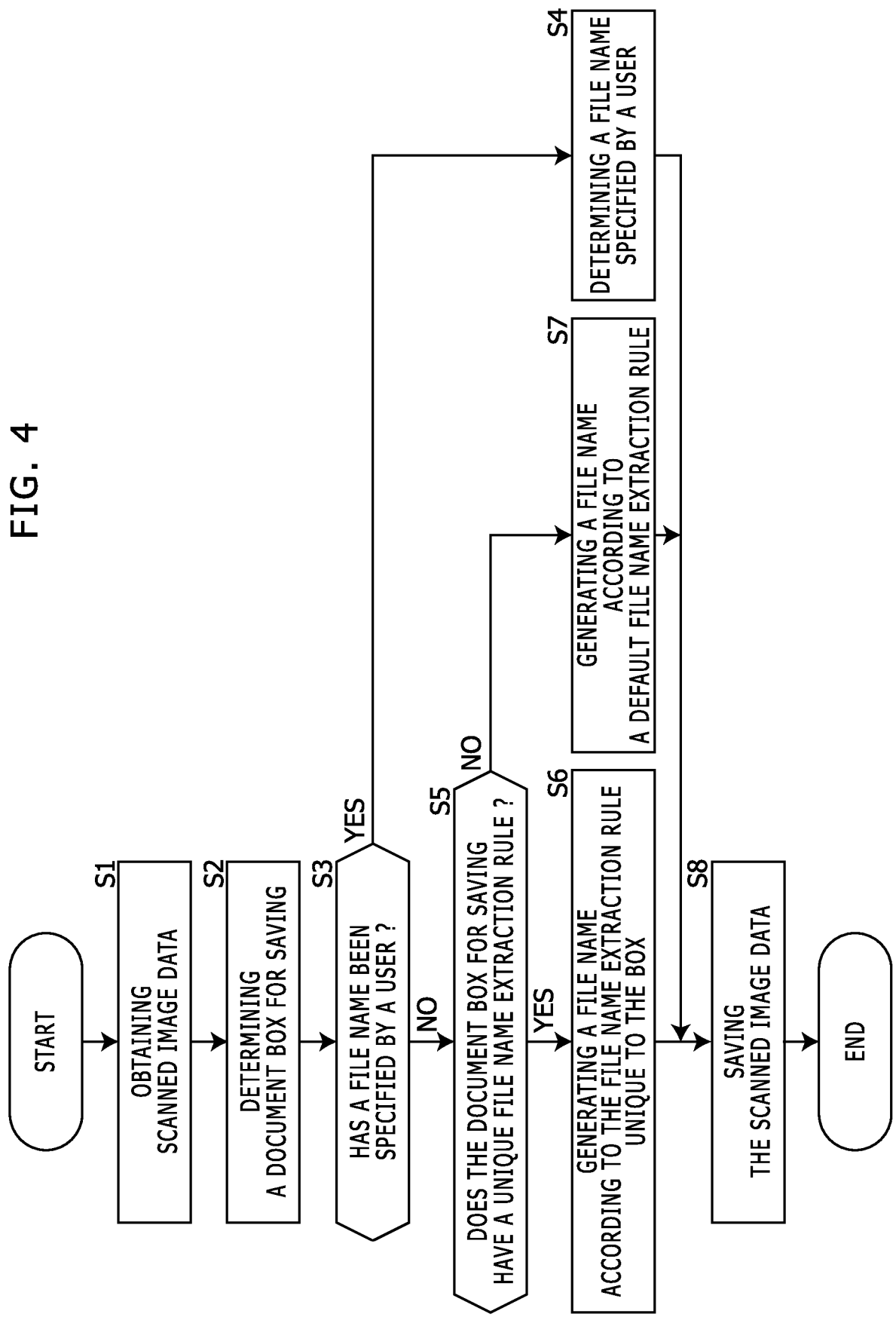
FIG. 4 shows a flowchart that explains a behavior of the image processing apparatus shown in FIG. 1.

The following part explains a behavior of the aforementioned image processing apparatus. FIG. 4 shows a flowchart that explains a behavior of the image processing apparatus shown in FIG. 1.

For example, when a user requests a scan-box-save job, the job managing unit 21 causes the image scanning device 1 to scan a document image, and obtains image data of the document image from the image scanning device 1 (in Step S1).

Subsequently, the box save processing unit 22 determines a document box 11 specified by the user (in Step S2), and determines whether a file name has been specified by the user or not (in Step S3).

If a file name has been specified by the user, the box save processing unit 22 specifies the file name as a file name of the document image and saves an image file of the document image in the specified document box 11 (in Step S4).

Otherwise, if a file name has not been specified by the user, the box save processing unit 22 determines whether box property data 12 of the specified document box 11 includes a file name extraction rule or not (in Step S5).

If the box property data 12 of the specified document box 11 includes a file name extraction rule, then the box save processing unit 22 determines an image area specified by the file name extraction rule in the document image, and extracts a text as a file name from the image area (in Step S6). When a file name is not obtained using the file name extraction rule, if other rule setting is set as ON, then a file name is generated on the basis of the other rule setting.

Otherwise, if the box property data 12 of the specified document box 11 includes a file name extraction rule, then box save processing unit 22 generates a file name on the basis of a default file name generation rule (i.e. a common rule to plural document boxes 11) (in Step S7).

The box save processing unit 22 applies the file name obtained in Step S4, S6 or S7 to the image file and saves the image file in the specified document box 11 (in Step S8).

FIG. 5 shows a diagram that explains a specific example of a file name determined from a document image.

If the file name extraction rule shown in FIG. 3 is applied, then for example, as shown in FIG. 5, (a) when an image file of a document image 101 (an example of a document) of a written estimate is saved in a document box 11 of which the box name is "WRITTEN ESTIMATE", a file name is determined by a file name extraction rule suitable for a document image 101 of a written estimate; and (b) when an image file of a document image 102 (an example of a document) of an application request form is saved in a document box 11 of which the box name is "APPLICATION REQUEST FORM", a file name is determined by a file name extraction rule suitable for a document image 102 of an application request form.

In the aforementioned embodiment, the box save processing unit 22 determines a document box 11 as a save location of an image file of a document image, specifies a file name of the document image, and saves the image file in the determined document box 11. In this process, the box save processing unit 22 (a) determines a file name extraction rule in box property data 12 of the determined document box 11, (b) extracts a file name from an area specified by the file name extraction rule in the document image, and (c) specifies the extracted file name to the image file and saves the image file in the determined document box 11.

Consequently, even when image files of documents are classified and saved into plural document boxes 11, the file names corresponding to a document boxes 11 are set so as to enable a user to easily know contents of the image files.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a storage device where one or plural document boxes are arranged; and
   a box save processing unit configured to determine a document box as a save location of an image file of a document image among the one or plural document boxes, specify a file name of the document image, and save the image file in the determined document box;
   wherein the box save processing unit (a) determines a file name extraction rule in box property data of the determined document box, (b) extracts a file name from an area specified by the file name extraction rule in the document image, and (c) specifies the extracted file name to the image file and saves the image file in the determined document box; wherein the file name extraction rule comprises of a predetermined extraction priority number, a predetermined extraction page number and a predetermined extraction position; and wherein the box save processing unit will automatically extract the file name from the area specified based on the predetermined extraction priority, page and position numbers.

2. The image processing apparatus according to claim 1, wherein if the box property data includes plural file name extraction rules, the box save processing unit repeatedly tries to extract a file name in an area specified by one of the file name extraction rules in the order of descending priorities set to the file name extraction rules until the file name is successfully extracted, and specifies the extracted file name to the image file and saves the image file in the determined document box.

3. The image processing apparatus according to claim 1, wherein when the image file saved in the document box is moved or copied to another document box, the box save processing unit determines a file name extraction rule in box property data of the another document box, extracts a file name from an area specified by the file name extraction rule in the document image, and specifies the extracted file name to the image file and saves the image file in the another document box.

4. The image processing apparatus according to claim 1, wherein when the file name extraction rule used to extract the file name is changed, the box save processing unit extracts a file name from an area specified by the changed file name extraction rule in the document image, and changes the current file name of the image file with the extracted file name.

5. The image processing apparatus according to claim 1, wherein the box property data includes other rule setting; and if a file name is not extracted in an area specified by the file name extraction rule in the document image, the box save processing unit automatically generates a file name on the basis of the other rule setting, specifies the generated file name to the image file, and saves the image file in the determined document box.

6. The image processing apparatus according to claim 1, wherein the box save processing unit sets as the document image an image scanned when a scan-box-save job is performed, determines the file name, and saves the image file in the determined document box.

7. The image processing apparatus according to claim 1, wherein the predetermined extraction position will comprise a value selected from a group consisting of: top left, top center, top right, bottom left, bottom center and bottom right.

8. The image processing apparatus according to claim 1, wherein the predetermined extraction position will comprise of a starting position and an ending position; wherein the starting position and the ending position will be the corners of an extraction rectangle that comprises the area selected.

\* \* \* \* \*